(12) United States Patent
Opitz et al.

(10) Patent No.: US 8,448,503 B2
(45) Date of Patent: May 28, 2013

(54) HOT-FILM AIR-MASS METER HAVING A FLOW SEPARATING ELEMENT

(75) Inventors: Bernhard Opitz, Leonberg (DE); Hans Hecht, Stuttgart (DE); Ulrich Wagner, Stuttgart (DE); Christoph Gmelin, Stuttgart (DE); Klaus Reymann, Karlstadt (DE)

(73) Assignee: Robert Bosch GmbH, Stuttgart (DE)

( * ) Notice: Subject to any disclaimer, the term of this patent is extended or adjusted under 35 U.S.C. 154(b) by 829 days.

(21) Appl. No.: 12/063,834

(22) PCT Filed: Jun. 14, 2006

(86) PCT No.: PCT/EP2006/063191
§ 371 (c)(1),
(2), (4) Date: Oct. 28, 2010

(87) PCT Pub. No.: WO2007/020116
PCT Pub. Date: Feb. 22, 2007

(65) Prior Publication Data
US 2011/0036157 A1    Feb. 17, 2011

(30) Foreign Application Priority Data
Aug. 16, 2005 (DE) .......................... 10 2005 038 598

(51) Int. Cl.
*G01M 15/04* (2006.01)
(52) U.S. Cl.
USPC ....................................... 73/114.34; 73/202.5
(58) Field of Classification Search
USPC ................. 73/114.31, 114.32, 114.33, 11.34, 73/202, 202.5, 204.11
See application file for complete search history.

(56) References Cited

U.S. PATENT DOCUMENTS

| 5,712,425 | A | * | 1/1998 | Hecht et al. ................. | 73/114.34 |
| 5,804,720 | A | | 9/1998 | Morimasa et al. | |
| 6,332,356 | B1 | * | 12/2001 | Hecht et al. .................. | 73/202.5 |
| 6,845,660 | B2 | | 1/2005 | Hecht et al. | |
| 7,260,986 | B2 | * | 8/2007 | Lenzing et al. ............. | 73/204.21 |
| 7,305,877 | B2 | * | 12/2007 | Beyrich et al. ............... | 73/202.5 |
| 2006/0137438 | A1 | * | 6/2006 | Lenzing et al. .............. | 73/118.2 |

FOREIGN PATENT DOCUMENTS

| DE | 19601791 | 7/1997 |
| DE | 19613176 | 10/1997 |
| DE | 10111840 | 10/2002 |
| DE | 10348400 | 2/2005 |

(Continued)

OTHER PUBLICATIONS

International Search Report, PCT International Patent Application No. PCT/EP2006/063191, dated Nov. 13, 2006.

*Primary Examiner* — Eric S McCall
(74) *Attorney, Agent, or Firm* — Kenyon & Kenyon LLP

(57) ABSTRACT

A hot-film air-mass meter for measuring an air-mass flow which flows in the main direction of the flow, which can be used, in particular, in the intake tract of an internal combustion engine. The hot-film air-mass meter comprises a sensor chip having a measuring surface. The air-mass flow flows essentially parallel over one surface of the sensor chip. A flow separating element is mounted upstream from the measuring surface with respect to the main flow direction. The at least one flow separating element is designed in such a way that the air-mass flow is separated from the measuring surface of the sensor chip in at least one separation zone prior to reaching the measuring surface.

16 Claims, 5 Drawing Sheets

FOREIGN PATENT DOCUMENTS

| | | |
|---|---|---|
| EP | 1221593 | 7/2002 |
| JP | 9-82763 | 3/1997 |
| JP | 9-236465 | 9/1997 |
| JP | 2002-174540 | 6/2002 |
| JP | 2003-90750 | 3/2003 |
| WO | WO 92/21940 | 12/1992 |

* cited by examiner

HOT-FILM AIR-MASS METER HAVING A FLOW SEPARATING ELEMENT

FIELD OF THE INVENTION

The present invention relates to a hot-film air-mass meter having a flow separating element for preventing surface contamination and signal drift due to surface contamination. Such hot-film air-mass meters are used in particular for measuring air-mass flows in the intake tract of internal combustion engines.

BACKGROUND INFORMATION

In many processes, for example, in the area of process engineering, chemistry, or mechanical engineering, a well-defined gas mass, in particular an air mass, must be supplied. This includes in particular combustion processes, which take place under controlled conditions. One important example is the combustion of fuel in internal combustion engines of motor vehicles, in particular having downstream catalytic emission control. Different types of sensors are used for measuring the air-mass flow.

One conventional sensor type is the so-called hot-film air-mass meter (HFM), a specific embodiment of which is described, for example, in German Patent Application No. DE 196 01 791 A1. In such hot-film air-mass meters, a thin sensor diaphragm is usually applied to a sensor chip, for example, a silicon sensor chip. At least one heating resistor, surrounded by two or more temperature measuring shunts, is usually situated on the sensor diaphragm. In an air flow guided over the diaphragm, the temperature distribution changes, which in turn may be detected by the temperature measuring shunts. An air-mass flow may thus be determined, for example, from the difference between the resistances of the temperature measuring shunts. There are different variants of this conventional sensor type. Such sensors are used, for example, directly in the intake tract of an internal combustion engine or in a bypass channel. One exemplary embodiment in which a sensor chip is used in a bypass channel is described, for example, in German Patent Application No. DE 103 48 400 A1.

A problem described, for example, in German Patent Application No. DE 101 11 840 C2, with this type of sensor is, however, that contamination of the sensor chip, by oil for example, often occurs. The sensor chip is normally used directly in the intake tract of the internal combustion engine or in a bypass channel to the intake tract of the internal combustion engine. Oil may deposit on the sensor chip and, in particular, on the sensor diaphragm during operation or shortly after the internal combustion engine has been shut off. This oil deposit may result in undesirable effects on the measuring signal of the sensor chip, in particular because an oil film affects the thermal conductivity of the sensor chip surface, which results in corruption of the measuring signals or a signal drift.

Also, liquids are subject to a force in the direction of the colder regions in the presence of a temperature gradient (see, for example, V. G. Levich, "Physicochemical Hydrodynamics," Prentice-Hall, N.J., 1962, p. 384 seq.) This is one of the reasons why, when operating a thermal air-mass flow meter at the border region of the heated measuring areas, liquids such as oil accumulate and over time result in a drift of the measuring signal of the hot-film air-mass meter. The air flow drives the liquid droplets and other contaminants on the surface up to the boundary of the heated measuring area, at which a stronger temperature gradient appears. The strong temperature gradient exerts a force opposite to the force exerted by the air flow. Liquid droplets thus accumulate on the boundary line, which, when they reach a certain size, may be entrained again by the air flow to then contaminate the surface of the measuring area. In addition to the oil droplets, other contaminants (e.g., dust) also reach the surface of the measuring area due to this effect.

This effect, whereby oil and other contaminants are driven onto the surface of the measuring area in irregular intervals, causes short-term and unpredictable signal instabilities of the hot-film air-mass meter in particular. These are caused, in particular, by the sporadically occurring contamination modifying the thermal conductivity of the surface of the measuring area, whereby a previously performed calibration of the hot-film air-mass meter becomes invalid. In addition to short-term changes, longer-lasting changes of the signal characteristic of the hot-film air-mass meter may also occur in particular if the contamination driven onto the measuring surface adheres there for a longer time.

Another problem arising from contamination accumulating in particular on the boundary of the measuring area is the effect on the flow dynamics of the hot-film air-mass meter. The hot-film air-mass meter is calibrated before being put in service, the calibration being based on a certain flow characteristic of the air-mass flow over the surface of the hot-film air-mass meter. If, however, contamination, in particular a liquid wall, accumulates on the boundary surface of the measuring area during operation, it also affects the velocity profile of the air-mass flow over the measuring surface and thus the temperature profile. Since, however, the heat transport on the measuring surface is a function of the shape of the velocity profile and temperature profile, this results in a signal drift of the hot-film air-mass meter.

SUMMARY

According to the present invention, an example hot-film air-mass meter is therefore proposed which avoids the disadvantages of the conventional hot-film air-mass meters. In particular one embodiment of the proposed hot-film air-mass meter has a highly reduced surface contamination and reduced signal instabilities which are due to the surface contamination. The hot-film air-mass meter is well suited in particular for measuring air-mass flows in the range between zero and 60 m/s and may be used in particular in the intake tract of an internal combustion engine.

Even dirt deposits of a reduced thickness, for example, as low as approximately 15 µm, may have a substantial influence on the flow characteristics of the air-mass flow over the surface of the hot-film air-mass meter. The contaminants may result in flow separation with delayed renewed contact of the flow with the sensor chip of the hot-film air-mass meter and a modified turbulence characteristic for modifying the boundary layer. This in turn may result in a signal drift. Therefore, according to an embodiment of the present invention, any type of influence on the velocity profile of the air-mass flow due to dirt deposits is minimized.

The example hot-film air-mass meter according to the present invention is used for measuring an air-mass flow flowing in the main flow direction and has a sensor chip having a measuring surface. The air-mass flow should flow essentially parallel over a surface of the sensor chip having the measuring surface as a component. "Essentially" is to be understood here in such a way that slight deviations from a parallel flow are tolerable, for example deviations of less than 10°. The hot-film air-mass meter may be used, for example, for measuring air-mass flows directly in the intake tract of an internal combustion engine or also in a bypass channel of the intake tract. The way the concept "main flow direction" is to be understood is thus a function of the installation site. In the case of installation in the intake tract, this may be understood in particular as the flow direction in the pipe. When installed in a bypass channel, which may be curved in some sections, "main flow direction" should be understood as the direction of transport of the air-mass flow in the partial section of the bypass channel in which the hot-film air-mass meter, in particular the sensor chip, is situated. In general, "main flow direction" is to be understood as the main direction of transport of the air-mass flow at the site of the sensor chip. Local turbulences may be ignored.

Basically any conventional sensor chip may be used as the sensor chip, for example the sensor chips proposed in German Patent Application No. DE 196 01 791 A1. However, basically any other types of hot-film air-mass meter sensor chips may also be used. The presence of a measuring surface on the sensor chip is, however, needed. This measuring surface should be characterized in that the sensor chip has a substantially lower transversal thermal conductivity in the area of the measuring surface than in the surrounding area of the sensor chip (main chip area). In the area of the measuring surface, the sensor chip may preferably have a transversal thermal conductivity which is less than in the surrounding area of the sensor chip by at least one order of magnitude.

For example, the sensor chip may have a transversal conductivity of 0.1 W/m K to 2 W/m K, compared to air with 0.026 W/m K and a surrounding silicon main chip area of 156 W/m K. This may be implemented, for example, as in the sensor chip described in German Patent Application No. DE 196 01 791 A1, via a silicon diaphragm which has a considerably lower transversal thermal conductivity in comparison with the surrounding silicon main chip area, since the transversal conductivity is generally determined here by the ambient air. However, other devices may also be used in which the measuring area has a strongly reduced transversal thermal conductivity. For example, the measuring area of the sensor chip may have a porous design, the pores causing a reduction in the thermal conductivity.

At least one heating element and at least two measuring shunts, which are designed as essentially parallel conductor tracks extending essentially perpendicularly to the main flow direction, may be situated on the measuring surface of the sensor chip in particular. The individual conductor tracks may also be slightly inclined with respect to each other; "essentially parallel" is to be understood as an inclination preferably no greater than ±3°. "Essentially perpendicular" is to be understood in that an angle of the conductor tracks of 90° to the main flow direction is preferred, angular tolerances of up to 5°, preferably of up to 2°, still being tolerable.

One core element of the present invention is that at least one flow separating element is situated upstream from the measuring surface in the main flow direction. This at least one flow separating element is designed in such a way that the air-mass flow is separated from the surface of the sensor chip by the flow separating element in at least one separation zone before reaching the measuring surface. One basic idea of this flow separating element is therefore to design the above-described area at the junction between the measuring surface and the main chip area of the sensor chip, in particular upstream from the measuring surface, in the first place as a "dead water region" with respect to flow mechanics. The flow separating element is designed in such a way that the at least one separation zone covers the area in which a high degree of contamination is known to occur during operation entirely or partially if possible. The at least one flow separating element therefore acts as a "protection wall" which is formed upstream from the boundary area between measuring surface and main chip area and which results in flow separation ("dead water"), but which, contrary to the flow separation caused by contamination, is well-defined and constant over time. This flow separation, i.e., the separation of a separation zone downstream from the at least one flow separating element, may also be taken into account when calibrating the sensor of the hot-film air-mass meter due to its well-defined character and constancy over time. Accumulation of dirt in the separation zone therefore has only a relatively slight influence on the velocity profile of the air-mass flow over the sensor chip, in particular over the measuring surface, and results in a highly reduced signal drift.

The measuring signal of the hot-film air-mass meter designed according to the present invention may therefore be considerably more stable compared to conventional hot-film air-mass meters. Signal drifts occur only to a highly reduced degree. Furthermore, the at least one flow separating element strongly reduces the risk of contaminants being driven onto the measuring surface of the sensor chip by the air-mass flow. All in all, the design of the hot-film air-mass meter according to the present invention causes a highly reduced susceptibility to faults and increased sturdiness of the system according to the present invention.

Advantageous embodiments of the present invention may be implemented individually or in combination. These advantageous refinements of the hot-film air-mass meter according to the present invention refer in particular to the type and design, as well as to the location of the at least one flow separating element. Thus, the at least one flow separating element may have at least one elevation, the at least one elevation having at least one upper edge at a distance from the surface of the sensor chip perpendicular to the main flow direction. "At a distance" is not necessarily to be understood in such a way that the flow separating element is situated on the surface of the sensor chip. Rather, it is preferred if the at least one flow separating element is situated on the hot-film air-mass meter upstream from the sensor chip. The upper edge should be situated accordingly higher only compared to the surface of the sensor chip. It is preferred if this upper edge projects over the surface of the sensor chip by at least 15 μm, preferably by at least 30 μm, and especially preferably by at least 40 μm, i.e., is at a distance from this surface perpendicularly to the main flow direction. This dimensioning of the at least one flow separating element has been found advantageous regarding typical deposits on the sensor chip.

The at least one flow separating element may have, for example, a flow wall, a wire, an auxiliary plate, a step, and/or an overhang, or a combination of the above-named elements. It is preferred in particular if the at least one flow separating element extends essentially parallel to the surface of the sensor chip, so that in particular the upper edge of the elevation extends essentially parallel to the surface of the sensor chip. As also in the definition of "essentially" regarding the parallel flow of the air-mass flow over the measuring surface, deviations from parallelism of up to approximately 10° are to be tolerable here. It is furthermore preferable if the at least one flow separating element extends essentially perpendicularly to the main flow direction. Here, also, deviations of up to 10° are tolerable.

Furthermore, as described above, the measuring surface may have at least one conductor track. This may be a conductor track of one or more temperature sensors and/or of one or more heating elements. In this case, it is preferable according to the present invention if the at least one flow separating element is situated, with respect to the main flow direction, upstream from the at least one conductor track (i.e., from the conductor track located the farthest upstream with respect to the main flow direction) by at least 30 μm, preferably by at least 50 μm, and especially preferably by at least 60 μm. Since generally the at least one flow separating element itself has a finite extension, these minimum figures preferably refer to the above-described upper edge of the at least one flow separating element, in particular to the distance along the main flow direction between this upper edge and the conductor track located the farthest upstream, or to the distance of the at least one flow separating element situated closest to the at least one conductor track. This refinement of the present invention prevents the separation zone from extending too far into the area of the at least one conductor track, in which case no laminar flow could be assumed over the at least one conductor track. The separation zone would then extend beyond the at least one conductor track and would distort the measurements there. Slight overlaps of the separation zone with the at least one conductor track are, however, tolerable.

In addition to this minimum distance to the conductor tracks, there are also other preferred locations of the at least one flow separating element. It is thus particularly preferable if the sensor chip has a boundary line at the junction between the measuring surface and the main chip area, and that the at least one flow separating element is situated upstream from the boundary line (i.e., from the section of this boundary line situated farthest upstream) with respect to the main flow direction by a maximum of 500 μm, preferably by a maximum of 300 μm, and especially preferably by a maximum of 200 μm. This maximum distance to the boundary line (situated upstream) results from the fact that, as described above, contaminants (in particular oil droplets) preferably accumulate on the boundary line exposed to the strongest temperature gradient. If the at least one flow separating element is too far upstream from this boundary line, this results in the flow again being in contact with the chip surface when it reaches the contaminants on the boundary line. Thus, in the area of the boundary line, the flow is again affected by contaminants on the boundary line so that the at least one flow separating element has lost its effect. Similarly to what was said above, in the case of a finite extension of the at least one flow separating element, the term "maximum" is to be understood in particular in such a way that a distance between the boundary line and the said upper edge and/or a distance between the boundary line and the part of the at least one flow separating element situated farthest from the boundary line is to be subsumed.

In addition to the above-mentioned specific embodiments of the at least one flow separating element, the at least one flow separating element may be further implemented by the sensor chip being situated in a depression of a chip carrier. For this purpose, the sensor chip is held in a chip carrier, the chip carrier having a carrier surface over which the air mass flows essentially parallel (deviation tolerance again approximately 10°). One surface of the sensor chip is situated in the chip carrier in a depression of the carrier surface, whereby a step is formed at the junction between chip carrier and sensor chip on the inflow side (i.e., upstream with respect to the main flow direction). The step acts as a flow separating element and forms a separation zone in the edge area of the sensor chip. The surface of the sensor chip is preferably situated at least 15 μm, in particular at least 30 μm, and especially preferably at least 40 μm deep with respect to the carrier surface. This specific embodiment is advantageous in particular (but not exclusively) when dirt deposits are actually to be expected due to thermal gradient forces near the edge of the sensor chip and not further inside the surface [sic] of the sensor chip. This is the case in particular when the measuring surface is manufactured as a large surface by porosification, for example (in contrast to a diaphragm which is usually not manufactured as a large surface), and extends up to the vicinity of the edge area of the chip surface.

BRIEF DESCRIPTION OF THE DRAWINGS

Example embodiments of the present invention are explained in greater detail with reference to the figures.

DETAILED DESCRIPTION OF EXAMPLE EMBODIMENTS

Figure 1:
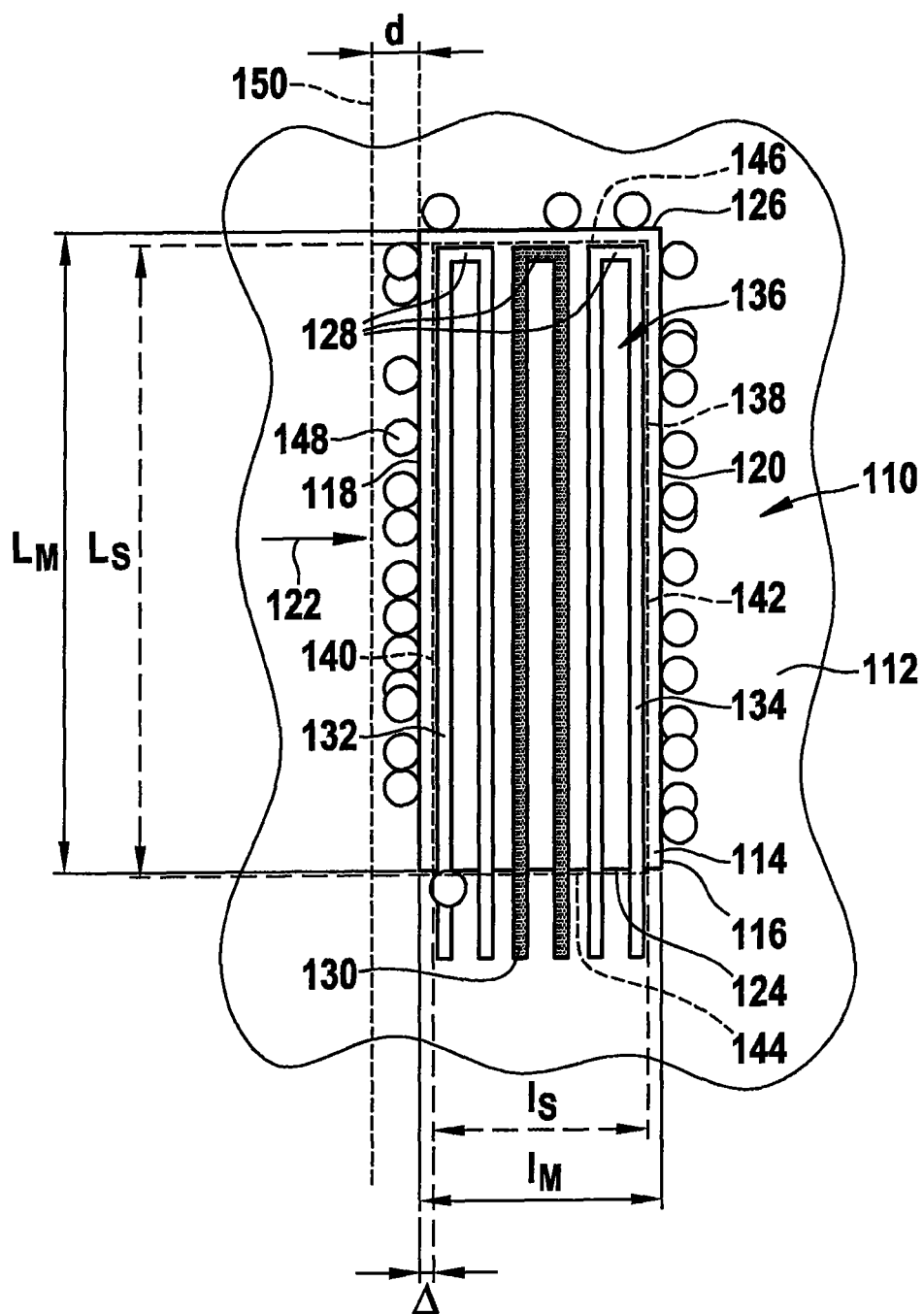
FIG. 1 shows an exemplary division of a sensor chip of a hot-film air-mass meter into a measuring surface and a main chip area.

FIG. 1 shows a design of a sensor chip 110 (only indicated) of a conventional hot-film air-mass meter (except for a flow separating element according to the present invention, see below). Sensor chip 110 may be used, for example, in the intake tract of an internal combustion engine or in a bypass channel to the intake tract of an internal combustion engine. German Patent Application No. DE 196 01 791 A1, for example, describes devices of this type. The sensor chip of the embodiment of FIG. 1 has a main chip area having a main chip area surface 112 in the plane of the drawing (illustrated schematically only). In this exemplary embodiment it is assumed that sensor chip 110 is a silicon sensor chip. Furthermore, sensor chip 110 has a measuring area having a measuring surface 114 in the plane of the drawing. In this exemplary embodiment, measuring surface 114 is designed in the shape of a rectangle 116, which has longer sides LM 118, 120 perpendicular to a main flow direction 122 of an air-mass flow. Longer side 118 thus represents the part of rectangle 116 situated farthest upstream and therefore the boundary line of measuring surface 114. Shorter sides $l_M$ of rectangle 116 are labeled using reference numerals 124, 126 and are situated parallel to main flow direction 122. In the area of measuring surface 114, sensor chip 110 has a thermal conductivity which is approximately 0.1 W/m K to 2 W/mK, compared to the surrounding main chip area having a conductivity of 126 W/m K. This may be achieved by porosifying the silicon in the area of measuring surface 114. Alternatively, a sensor diaphragm, having a thermal conductivity of 0.026 W/m K laterally essentially determined by the ambient air, may be used.

Conductor tracks 128 of a central hot-film air-mass meter circuit are situated in the area of measuring surface 114. These conductor tracks 128 are composed of a central heating element 130 and two temperature sensors 132, 134. One temperature sensor 132 is situated upstream from central heating element 130 and one temperature sensor 134 is situated downstream. The external dimensions of conductor tracks 128 delimit a sensor area 136 on measuring surface 114. In this exemplary embodiment, this sensor area 136 is also designed in the shape of a rectangle 138, which has longer sides 140, 142 and shorter sides 144, 146. Terminal-side shorter side 144 of the rectangle is situated on terminal-side shorter side 124 of rectangle 116 of the measuring surface. The side lengths of rectangle 138 of sensor area 136 are labeled $L_S$ and $l_S$ in FIG. 1. In the exemplary embodiment of FIG. 1, corresponding to the related art, conductor tracks 128 of the central hot-film air-flow meter circuit extend almost to outer rectangle 116 of measuring surface 114. Typically longer sides 118, 120 of rectangle 116 have a length LM of approximately 1,600 µm and shorter sides 124, 126 of rectangle 116 have a length of 1M=450 µm to 500 µm. Rectangle 138 of sensor area 136 is dimensioned only slightly smaller, $L_s$ being approximately 0.9 to 0.95×LM and $l_S$ being approximately $0.7 \times l_M$, for example.

Figure 2A:
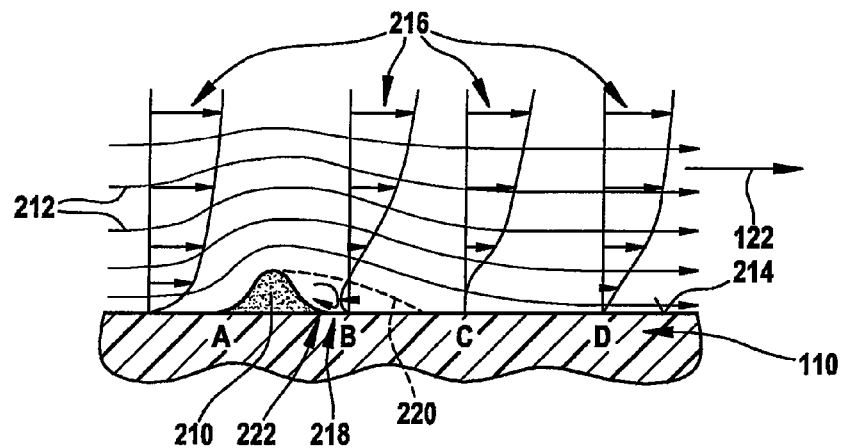
FIG. 2A shows a schematic illustration of the influence on an air-mass flow over a surface by a contaminant applied to the surface.

Furthermore, FIG. 1 also shows the problem of accumulation of oil droplets 148 along rectangle 116 of measuring surface 114. These oil droplets 148 are therefore situated in the immediate vicinity of conductor tracks 128. A slight external force, exerted, for example, by the air-mass flow, causes oil droplets 148 to be driven onto conductor tracks 128. Furthermore, the accumulation of oil droplets 148 also causes a change in the thermal conductivity of sensor chip 110 in the area of the edge of rectangle 116 of measuring surface 114. In particular, oil droplets 148 may increase the conductivity at the junction between measuring surface 114 and main chip area 112. This has a significant effect on the temperature distribution on measuring surface 114. In addition, oil droplets 148 often form an adhesion-promoting agent for dust and soot. Furthermore, in many cases an "oil wall" having a height of approximately 15 µm to 30 µm is formed in the area of the edge of rectangle 116 of the measuring surface, which results in air turbulence in this area, which does not disappear before a certain distance is traveled. This effect is shown in detail in FIG. 2A. FIG. 2A shows the influence of dirt deposits in the inflow area of a hot-film air-mass meter on the velocity profile of the air-mass flow meter over sensor chip 110 of the hot-film air-mass meter.

In the illustration of FIG. 2A, it has been assumed for the sake of simplicity that oil droplets 148 (see FIG. 1) have accumulated on inflow-side longer side 140 of rectangle 138 to form a "contamination wall" 210. In addition to oil droplets 148, further contaminants may contribute to this contamination wall 210, for example dust or other airborne particles.

Furthermore, FIG. 2A shows flow lines 212 of an air-mass flow, whose main flow direction 122 is parallel to a surface 214 of sensor chip 110. In addition to the flow lines, flow profiles 216 are shown for selected points on surface 214, which symbolize the velocity profile of the air-mass flow over surface 214.

Figure 2B:
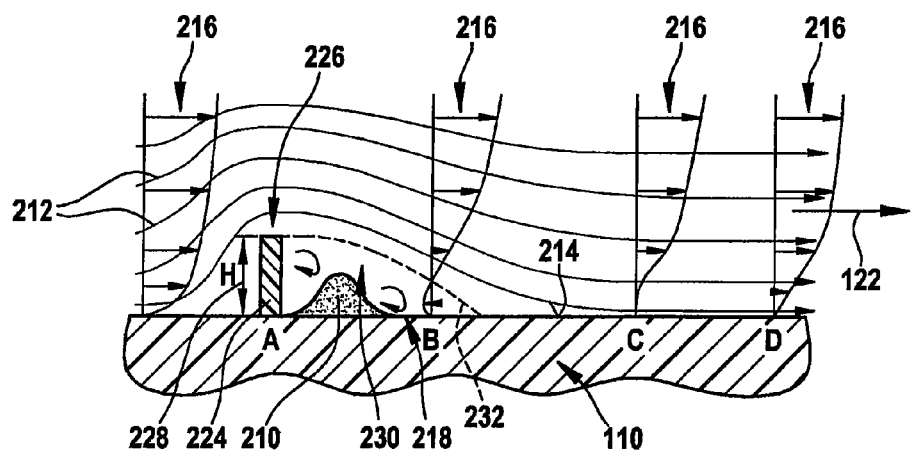
FIG. 2B shows an arrangement according to FIG. 2A having a flow separating element applied upstream from the contaminant.

As is apparent from the illustration of FIG. 2A, a separation zone 218 is formed due to the contaminants downstream from (with respect to main flow direction 122) contamination wall 210. The boundary of this separation zone 218 formed due to contaminants is represented symbolically by dashed line 220. While in the example of FIG. 2A an essentially laminar flow prevails over surface 214 outside separation zone 218 formed due to contaminants, this flow is separated in separation zone 218 formed due to contaminants, whereby air turbulence 222 is formed in this separation zone 218. Since, as illustrated in FIG. 1, oil droplets 148 and thus contamination wall 210 are formed predominantly along side 118 of rectangle 116 of measuring surface 114 due to the above-described temperature gradient, separation zone 218 formed due to contaminants reaches measuring surface 114 and up to the area of conductor tracks 128. In the case of air flows of approximately 60 m/s, separation zone 218 formed due to contaminants typically has a dimension parallel to main flow direction 122 of approximately 200 µm to 300 µm. Since longer side 118 of rectangle 116 of FIG. 1 has a distance Δ of only approximately 68 µm to 150 µm from longer side 140 of rectangle 138, separation zone 218 formed due to contaminants influences the flow characteristics above conductor tracks 128. Since the height of contamination wall 210 as described above is not constant over time, velocity profile 216 over sensor area 136 is also not constant over time, which results in a drift and instabilities of the measuring signal of the hot-film air-mass meter over time. In contrast, FIG. 2B shows an example in which, unlike in FIG. 2A, a flow separating element 224 according to the present invention is situated upstream from contamination wall 210. In the illustration of FIG. 2B, this flow separating element 224 has the shape of a wall having a rectangular cross section and an upper edge 226, which in this exemplary embodiment lies above surface 214 of sensor chip 110 by a height H (reference numeral 228) of approximately 30 µm. Flow separating element 224 thus has approximately twice the height of contamination wall 210 (approximately 15 µm, see above) in this exemplary embodiment.

As FIG. 2B shows, similarly to the description of FIG. 2A, a separation zone 230 having a boundary 232 of separation zone 230 is now also formed downstream from flow separating element 224, almost completely enclosing separation zone 218 formed due to contaminants. Contrary to the illustration of FIG. 2A and separation zone 218 formed due to contaminants, separation zone 230 of flow separating element 224 does not depend on the height of contamination wall 210 and is therefore constant over time.

Although it also extends up to conductor tracks 128, this separation zone 230 may therefore also be taken into account in calibrating the hot-film air-mass meter. The additional effects of separation zone 218 formed due to contaminants are not or are only slightly noticeable, so that the calibration of the hot-film air-mass meter is independent of the height of contamination wall 210. One additional effect of flow separating element 224 is that it prevents contamination wall 210 from being driven onto sensor area 136 of sensor chip 110 by the air-mass flow.

FIG. 1 shows the position of flow separating element 224 (not known from the related art) symbolically by dashed line 150. It is apparent that in this preferred exemplary embodiment flow separating element 224 extends essentially parallel to conductor track strips 128, i.e., essentially perpendicularly to main flow direction 122 of the air-mass flow. The distance between longer side 118 of rectangle 116 and flow separating element 224 is symbolically labeled with d in FIG. 1 and in this exemplary embodiment it is approximately 200 µm.

In FIGS. 3A through 3D, different exemplary embodiments for implementing flow separating element 224 are shown, which may be used alternatively to the "wall" used in FIG. 2B. It should be pointed out, however, that other specific embodiments of flow separating element 224 are also possible. The hot-film air-mass meter in the exemplary embodiments of FIG. 3A through 3D each has a chip carrier 310, to which or over which the air-mass flow (symbolically represented by flow direction 122) flows via an inflow edge 312. Chip carrier 310 is designed, for example, as an injection molded plastic part. Sensor chip 110 is installed in a depression of chip carrier 310 as described above, surface 214 of sensor chip 110 being essentially flush with carrier surface 314 of chip carrier 310. The design of measuring surface 114 of sensor chip 110 corresponds, for example, to the design in FIG. 1.

Figure 3A:
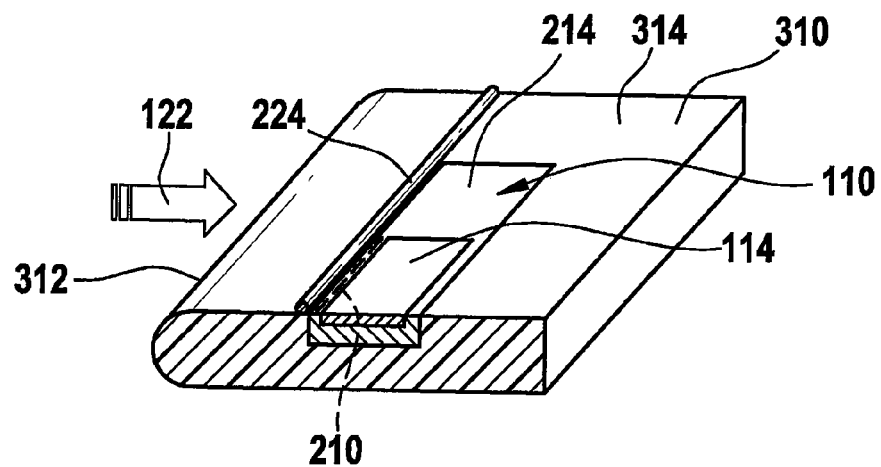
FIGS. 3A through 3D show different exemplary embodiments of the design of a flow separating element.
Figure 3B:
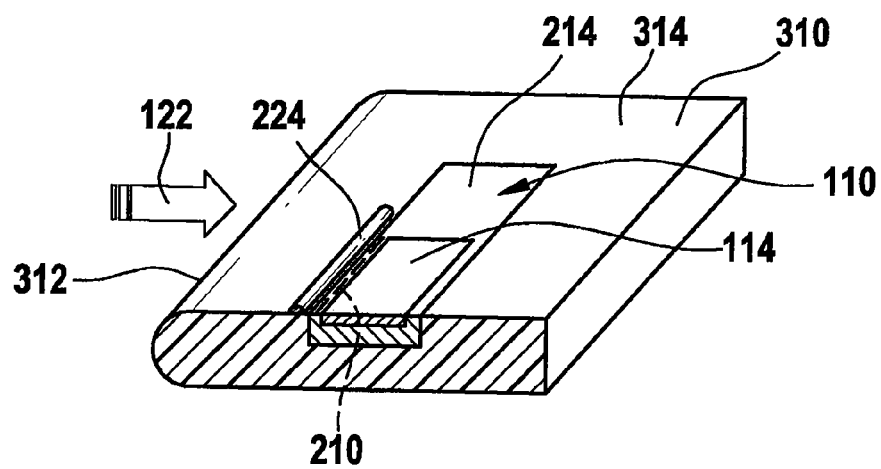

The exemplary embodiments of the hot-film air-mass meters of FIGS. 3A through 3D differ in the design of flow separating element 224. Thus, in the preferred configuration according to FIG. 3A, flow separating element 224 is configured as a long wire, which extends parallel to inflow edge 312. This exemplary embodiment is preferred because this shape of flow separating element 224 is technically easy to implement and may therefore be manufactured reliably and cost-effectively. FIG. 3B shows flow separating element 224 in the form of a glued-on bead, which may be manufactured, for example, by applying a self-setting, a UV-setting, or a temperature-setting adhesive. This embodiment is also technically implementable in a relatively simple and cost-effective manner.

Figure 3C:
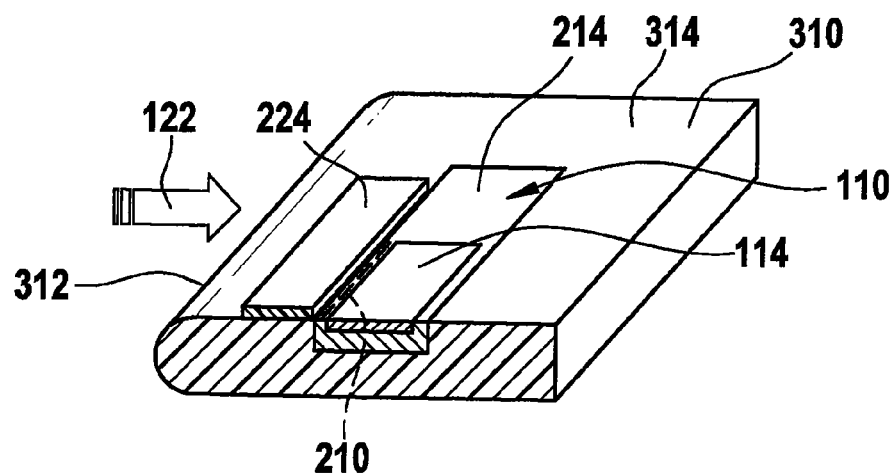
Figure 3D:
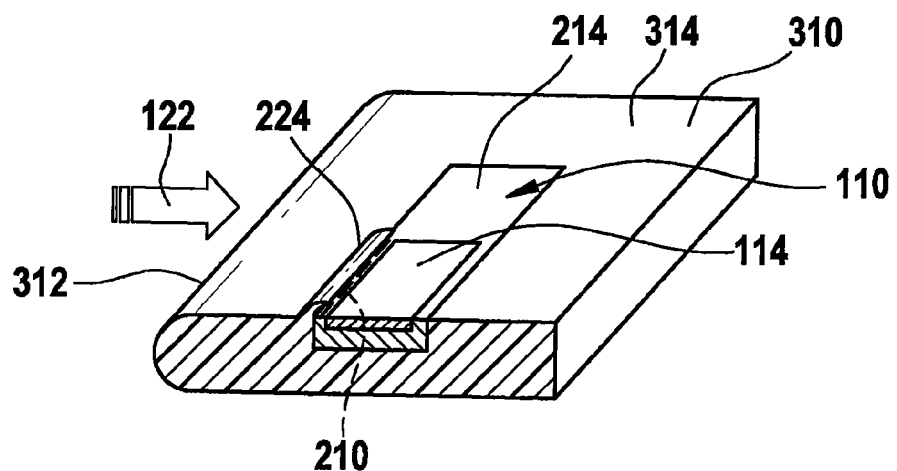

In the embodiment according to FIG. 3C, a lamina acting in its entirety as a flow separating element 224 is applied to chip carrier 310 upstream from sensor chip 110 on the inflow side. In contrast, in the embodiment of FIG. 3D, flow separating element 224 is designed as an overhang, which projects about 100 μm over sensor chip 110. This overhang may be designed as an integral component of chip carrier 310, for example, and be molded, for example, as early as during the manufacture (for example, by injection molding) of chip carrier 310. Alternatively or additionally, the overhang may also be applied to chip carrier 310 as a separate component.

Figure 4:
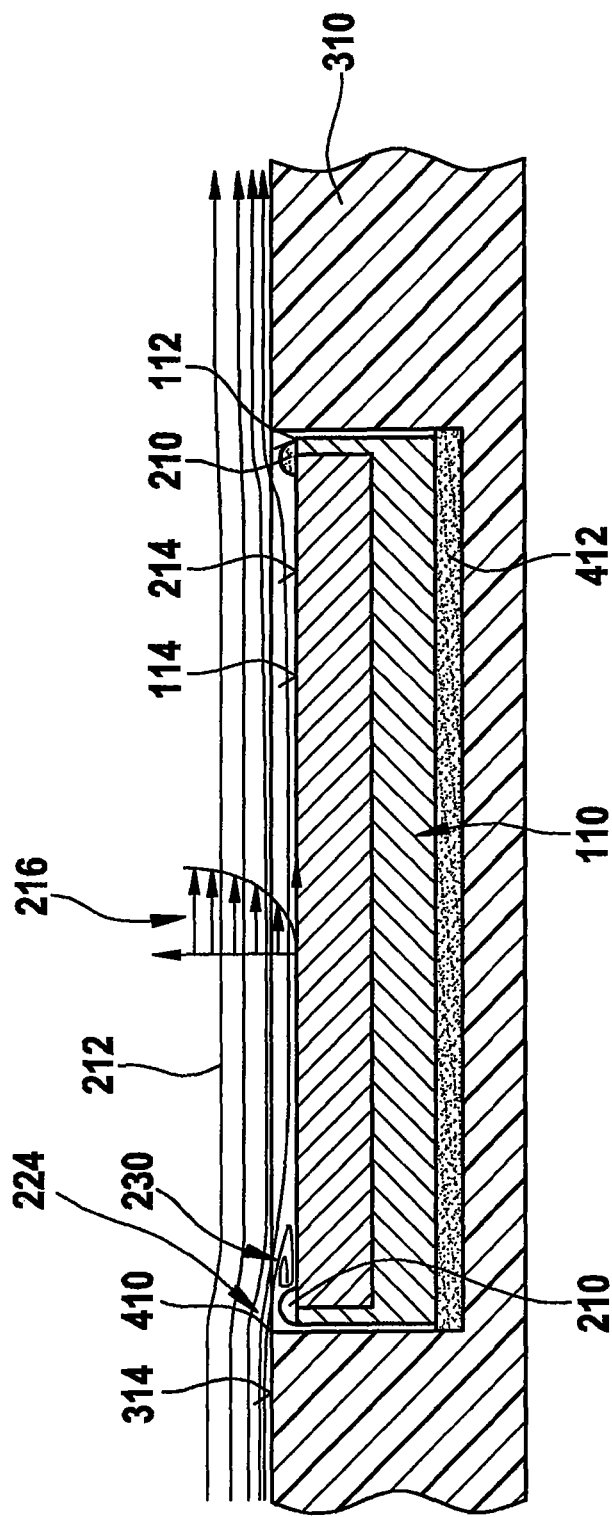
FIG. 4 shows a design of a flow separating element in the form of a sensor chip installed in a depression of a chip carrier.

Finally, in FIG. 4, another exemplary embodiment of a hot-film air-mass meter is illustrated, in which sensor chip 110 is installed in a depression of chip carrier 310. Sensor chip 110 is again designed similarly to the illustration of FIG. 1 and has a chip surface 214 having a measuring surface 114 and a main chip surface 112. The exemplary embodiment of FIG. 4 is, as described above, particularly advantageous for sensor chips 110, in which measuring surface 114 extends to the vicinity (i.e., for example, <400 μm) of the edge of chip surface 214, i.e., for example, in measuring surfaces 114 manufactured by porosification. In this exemplary embodiment, surface 114 of sensor chip 110 is located at a depth of approximately 60 μm from the surface of [chip] carrier 314, so that edge 410 forms flow separating element 224 and corresponds to upper edge 226 in the illustration of FIG. 2B. A separation zone 230 is thus formed downstream from edge 410, similarly to FIG. 2B. This separation zone 230 includes contamination wall 210 and possibly a separation zone 218 of contamination wall 210 formed due to contaminants. Flow separating element 224 therefore has the same effect in this exemplary embodiment as in the above-described cases. In this example, sensor chip 110 is bonded to chip carrier 310 via a bonding layer 412 (for example an adhesive) and is firmly mounted in its depression. By modifying the thickness of bonding layer 412, the depth of the depression of surface 214 of sensor chip 110 with respect to chip carrier surface 314, and thus the size of separation zone 230, may be adjusted.

What is claimed is:

1. A hot-film air-mass meter for measuring an air-mass flow flowing in a main flow direction for use in an intake tract of an internal combustion engine, comprising:
   a hot-film air-mass meter including a sensor chip having a measuring surface, the air-mass flow flowing essentially parallel over a surface of the sensor chip; and
   at least one flow separating element situated upstream from the measuring surface with respect to a main flow direction, the at least one flow separating element being designed for separating the air-mass flow from the surface of the sensor chip before it reaches the measuring surface in at least one separation zone;
   wherein the sensor chip also has a main chip area surrounding the measuring surface, a junction between the measuring surface and the main chip area defining a boundary line, wherein the at least one flow separating element is situated upstream from the boundary line by a maximum of 500 μm with respect to the main flow direction.

2. The hot-film air-mass meter as recited in claim 1, wherein the at least one flow separating element has at least one elevation, the at least one elevation having at least one upper edge at a distance perpendicular to the main flow direction from the surface of the sensor chip.

3. The hot-film air-mass meter as recited in claim 1, wherein the at least one flow separating element has at least one of a flow wall, a wire, an auxiliary plate, a step, and an overhang.

4. The hot-film air-mass meter as recited in claim 1, wherein the at least one flow separating element extends at least one of: i) essentially parallel to the surface of the sensor chip; and ii) essentially perpendicularly to the main flow direction.

5. The hot-film air-mass meter as recited in claim 1, wherein the at least one flow separating element is situated upstream from the boundary line by a maximum of 300 μm with respect to the main flow direction.

6. The hot-film air-mass meter as recited in claim 1, wherein the at least one flow separating element is situated upstream from the boundary line by a maximum of 200 μm with respect to the main flow direction.

7. The hot-film air-mass meter as recited in claim 1, wherein the at least one upper edge of the elevation is distanced perpendicular to the main flow direction from the surface of the sensor chip by a height H of at least 15 μm.

8. The hot-film air-mass meter as recited in claim 7, wherein the height H is at least 30 μm.

9. The hot-film air-mass meter as recited in claim 7, wherein the height H is at least 40 μm.

10. The hot-film air-mass meter as recited in claim 1, wherein the measuring surface has at least one conductor track, the at least one flow separating element being situated upstream from the at least one conductor track by at least 30 μm with respect to the main flow direction.

11. The hot-film air-mass meter as recited in claim 10, wherein the at least one flow separating element is situated upstream from the at least one conductor track by at least 50 μm with respect to the main flow direction.

12. The hot-film air-mass meter as recited in claim 10, wherein the at least one flow separating element is situated upstream from the at least one conductor track by at least 60 μm with respect to the main flow direction.

13. A hot-film air-mass meter for measuring an air-mass flow flowing in a main flow direction for use in an intake tract of an internal combustion engine, comprising:
    a hot-film air-mass meter including a sensor chip having a measuring surface, the air-mass flow flowing essentially parallel over a surface of the sensor chip;
    at least one flow separating element situated upstream from the measuring surface with respect to a main flow direction, the at least one flow separating element being designed for separating the air-mass flow from the surface of the sensor chip before it reaches the measuring surface in at least one separation zone; and
    a chip carrier, the sensor chip being mounted in the chip carrier, wherein the chip carrier has a carrier surface over which the air-mass flows essentially in parallel, the surface of the sensor chip being situated in a depression of the chip carrier with respect to the carrier surface, an edge being formed on the inflow side at the junction between the chip carrier and the sensor chip.

14. The hot-film air-mass meter as recited in claim 13, wherein the surface of the sensor chip is situated at a depth of at least 15 μm with respect to the carrier surface.

15. The hot-film air-mass meter as recited in claim 13, wherein the surface of the sensor chip is situated at a depth of at least 30 μm with respect to the carrier surface.

16. The hot-film air-mass meter as recited in claim 13, wherein the surface of the sensor chip is situated at a depth of at least 40 μm with respect to the carrier surface.

* * * * *

UNITED STATES PATENT AND TRADEMARK OFFICE
CERTIFICATE OF CORRECTION

PATENT NO. : 8,448,503 B2
APPLICATION NO. : 12/063834
DATED : May 28, 2013
INVENTOR(S) : Opitz et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1501 days.

Signed and Sealed this
Eighth Day of September, 2015

Michelle K. Lee
*Director of the United States Patent and Trademark Office*